E. M. STERNBERG.
RADIUS ROD FOR MOTOR VEHICLES.
APPLICATION FILED FEB. 9, 1920.
1,402,806.
Patented Jan. 10, 1922.
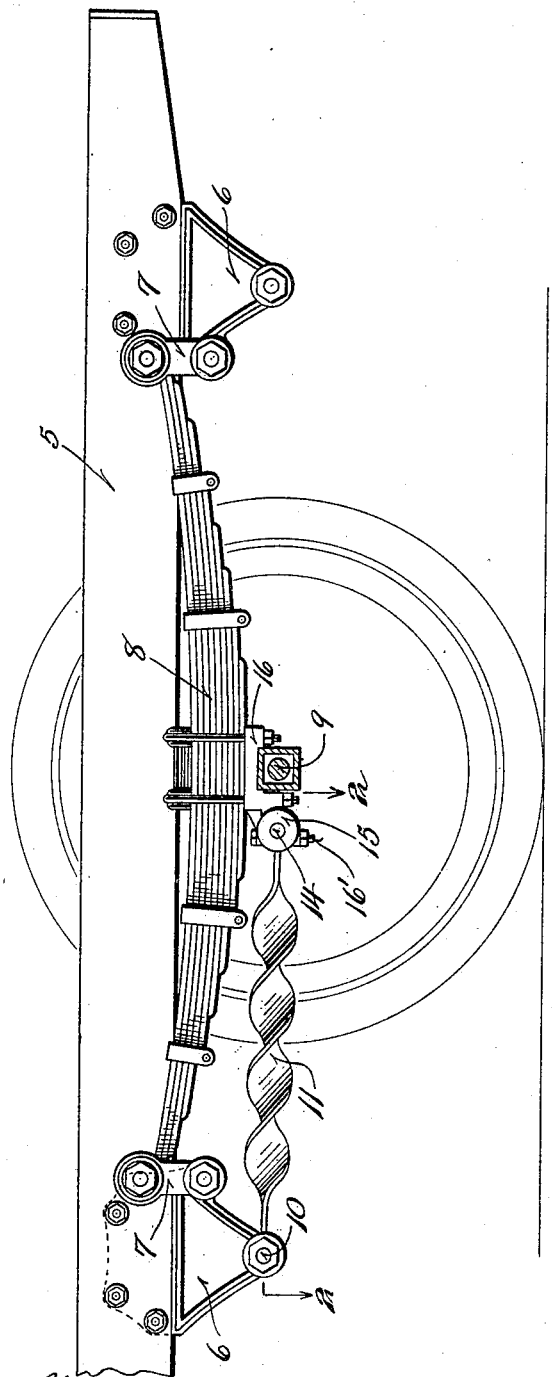
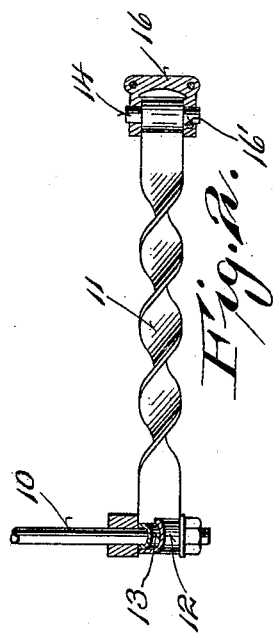
Inventor
E. M. Sternberg
Witness
J. F. Britt
By Young & Young
Attorneys

UNITED STATES PATENT OFFICE.

ERNST M. STERNBERG, OF WEST ALLIS, WISCONSIN.

RADIUS ROD FOR MOTOR VEHICLES.

1,402,806.  Specification of Letters Patent.  Patented Jan. 10, 1922.

Application filed February 9, 1920. Serial No. 357,309.

*To all whom it may concern:*

Be it known that I, ERNST M. STERNBERG, a citizen of the United States, and resident of West Allis, in the county of Milwaukee and State of Wisconsin, have invented certain new and useful Improvements in Radius Rods for Motor Vehicles; and I do hereby declare that the following is a full, clear, and exact description thereof.

My invention relates to new and useful improvements in radius or brace rods for connecting relatively movable members to prevent their relative movement in certain directions, and it is more particularly directed to the provision of a radius rod for connecting the axle of a motor vehicle with one of the frame carried parts thereof.

It is in general the object of my invention to provide a radius rod structure which posesses maximum simplicity and lightness of metal consistent with sufficient strength to meet the stresses which will be encountered.

In motor vehicle design, particularly of the heavier truck type, it is customary to provide brace or radius rods connecting the rear axle with side frame portions of the vehicle, the ends of these radius rods being provided with universal joints to permit the relative vertical movements of the axle and frame and to permit the slight relative lateral movement incidental to side sway or rocking action. Such universal joints constitute an objectionable item of wear and possess further disadvantages.

It is therefore more particularly my object to provide a radius rod structure which permits the necessary relative vertical and lateral movements of the parts connected thereby without the necessity of providing universal joint connections for the ends of the rod, and I contemplate carrying out this object by providing a radius rod which is transversely flexible to permit lateral relative movements of members connected thereby, but which possesses sufficient resistance to longitudinal stresses as to effect the desired brace function of the rod in preventing movement of the rod connecting portions in a direction longitudinal of the rod.

With the above and other objects and advantages in view, which will be apparent as the description proceeds, my invention resides in the novel features of construction, combination and arrangement of parts which will be hereinafter more particularly described and defined by the appended claims.

In the accompanying drawings:

Figure 1 is a side elevational view of the rear spring and adjacent frame structure of a motor vehicle, the rear axle thereof being shown in section.

Figure 2 is a sectional view on a plane indicated in general by the line 2—2 of Figure 1.

Referring now more particularly to the accompanying drawings, 5 designates one of the side sills of a motor vehicle chassis, having a pair of hanger brackets 6 depending therefrom and carrying shackle links 7 for securement of the ends of the spring 8 which is secured to the rear axle 9. The lower ends of the hanger brackets form bearings for transverse shafts 10 of the frame structure, and in the present instance the ends of one of the shafts is extended outwardly of its hanger brackets to mount the frame connected end of my improved radius or brace rod.

I form my improved radius rod of material so shaped as to permit a certain lateral flexure of the rod, upon the application of lateral stress to the rod, but which possesses sufficient strength in resistance to longitudinal stress so as to prevent lateral flexure or buckling of the rod incidental to the application of longitudinal stress. A brace rod connected to one of the hanger brackets 6 and to the rear axle 9, and possessing the aforerecited features of strength, would thus permit the relative vertical and lateral movements necessarily occurring between the rear axle and vehicle frame, but would prevent relative forward or rearward movement of the vehicle axle which it is the conventional function of the radius rod to prevent.

In the present structure, I procure the aforerecited results by forming my radius rod 11 of an elongated strip of relatively thick metal which is provided with a helical twist throughout the greater portion of its length, the ends of the strip being turned to provide transverse attaching sleeves 12. Bushings 13 are preferably shrunk within these sleeve portions 12. The forward end of each radius rod is mounted on an adjacent cross shaft 10 by passing said shaft through the bushing 13, whereby a pivotal connection is afforded for the radius rod permitting movement in a vertical plane to compensate for the yielding action of the vehicle springs 8. The rear end of each radius rod is secured in a similar pivotal manner by a pin 14 passed through the rear end bushing 13, said pin being secured in a bearing portion 15 preferably formed on the adjacent spring seat 16 of the rear axle, the pin being held against displacement by a bolt 16' passed through the bearing portion 15 and engaged in the notch of a pin.

I have thus provided an exceedingly simple and efficient radius rod structure which eliminates the necessity of providing universal joint connections for the ends of the rod, thus reducing the element of wear to a minimum, since lateral relative movements of the axle and vehicle body are taken up by flexure of the radius rod, and since the bushings 13 take up the wear incidental to vertical oscillations of the radius rod incidental to the normal spring action in travel.

While I have shown and described a preferred embodiment of my invention, it will be appreciated that various changes and modifications of structure may be employed to meet differing conditions of use and manufacture, without departing in any manner from the spirit of my invention.

What is claimed is:

1. A brace rod of the character described comprising a flat elongated strip of metal twisted throughout the major portion of its length whereby to stiffen said strip against longitudinal stress in a manner permitting flexure of the strip upon relatively slight lateral stress.

2. In a vehicle of the class described, the combination with a frame carried vehicle portion and a relatively movable axle carried portion, of a radius rod having its ends secured to said portions, said rod being twisted throughout the major portion of its length to permit transverse flexure in the body thereof upon relative lateral movement of said portions and to resist yielding transverse flexure due to longitudinal stress upon tendency of relative movement of said portions longitudinally of the rod.

3. In a vehicle of the class described, the combination with a frame carried vehicle portion and a relatively movable axle carried portion, of a radius rod comprising a flat elongated strip of metal having its ends secured to said portions, said strip of metal being twisted throughout the major portion of its length whereby to stiffen said strip against longitudinal stress in a manner permitting flexure of the strip upon relatively slight lateral stress.

4. In a vehicle of the class described, the combination with a horizontally extending frame carried bearing member and a relatively movable axle carried bearing member, of a radius rod formed of a flat elongated strip of metal having its end portions bent to form transverse terminal sleeves mounted on said bearing members, said strip being twisted throughout the major portion of its length whereby to stiffen said strip against longitudinal stress in a manner permitting flexure of the strip upon relatively slight lateral stress.

In testimony that I claim the foregoing I have hereunto set my hand at West Allis, in the county of Milwaukee and State of Wisconsin.

E. M. STERNBERG.